July 9, 1968 R. E. McGARTHWAITE ETAL 3,392,071
SIDEWALL STRIP PRODUCING MEANS AND APPARATUS
Filed Sept. 29, 1964 2 Sheets-Sheet 1
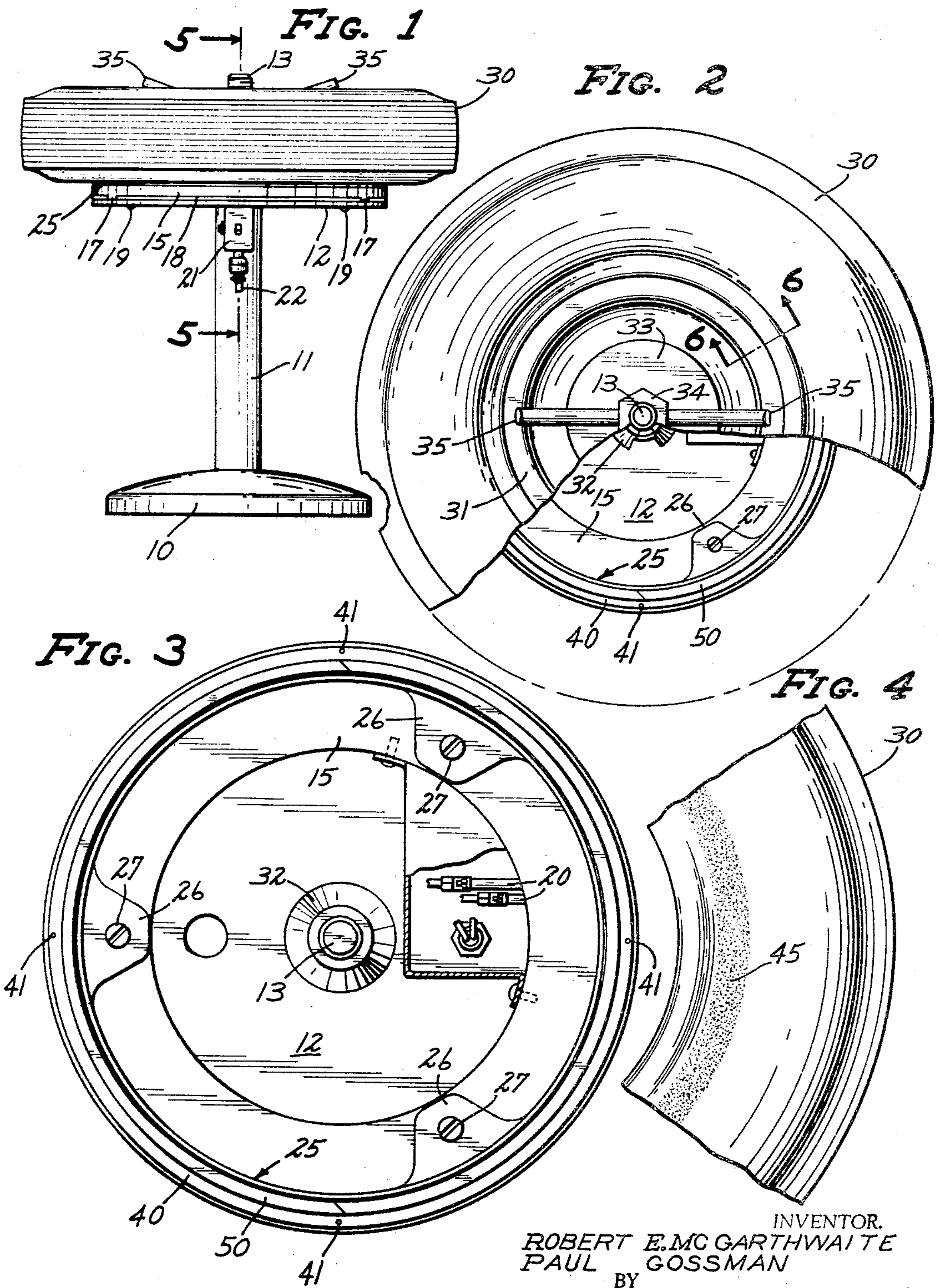
INVENTOR.
ROBERT E. MC GARTHWAITE
PAUL GOSSMAN
BY
Merchant, Merchant & Gould
ATTORNEYS SIDEWALL STRIP PRODUCING MEANS AND APPARATUS
Filed Sept. 29, 1964 2 Sheets-Sheet 2
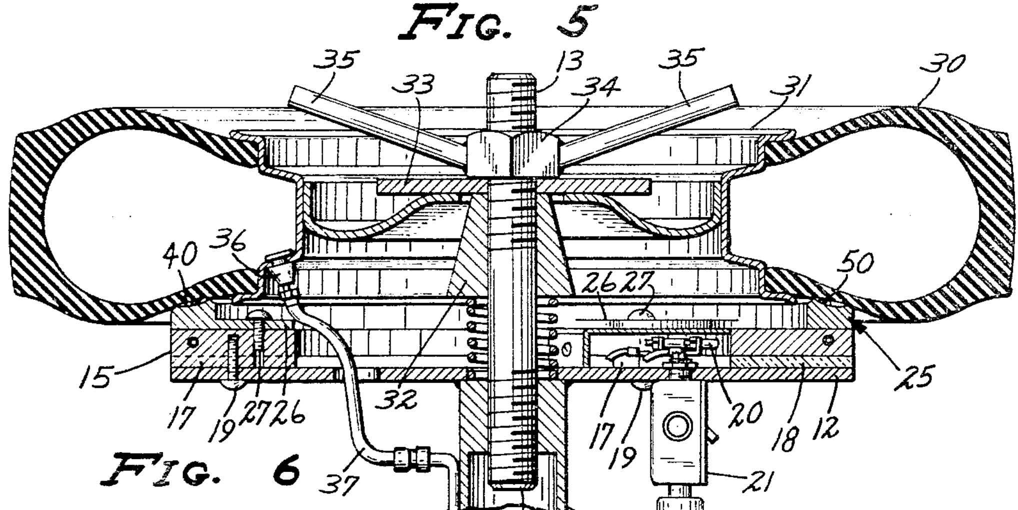
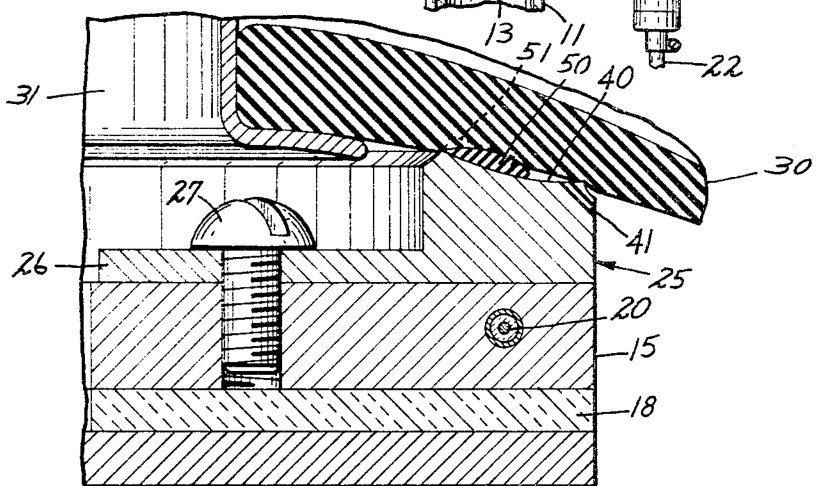
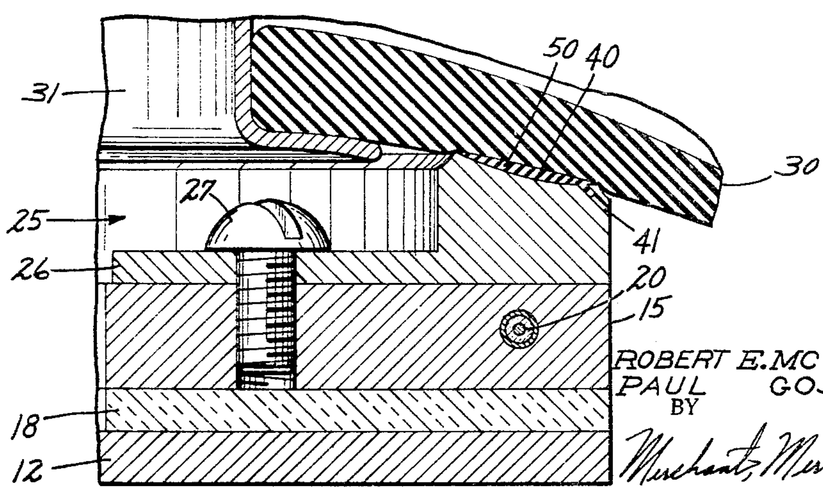
INVENTOR.
ROBERT E. MC GARTHWAITE
PAUL GOSSMAN
BY
Merchant, Merchant & Gould
ATTORNEYS United States Patent Office 3,392,071

Patented July 9, 1968

3,392,071

SIDEWALL STRIP PRODUCING MEANS AND APPARATUS

Robert E. McGarthwaite, 1155 Burr St., St. Paul, Minn. 55101, and Paul Gossman, 1380 9th St., Cuyahoga Falls, Ohio 44221

Filed Sept. 29, 1964, Ser. No. 399,966
2 Claims. (Cl. 156—116)

ABSTRACT OF THE DISCLOSURE

Apparatus including an annular matrix having a groove therein with an arcuate cross-section and a heating element adapted to heat the matrix to approximately the flowing point of an elastomer with the annular groove abutting the side of a tire, so that the elastomer flows into a sidewall having feathered edges. The matrix further includes vents for allowing gases and excess elastomer to flow therethrough.

This invention pertains to methods and apparatus for providing a white or colored sidewall strip on a rubber tire and more particularly to methods and apparatus for providing a white or colored sidewall strip firmly bonded to the tire and having feathered edges.

In prior art devices a strip of uncured rubber or other elastomer approximately the same width as that desired for the final sidewall strip is placed in an annular mold having a groove therein the same width as the uncured rubber. The tire on which the sidewall strip is to be provided is then abutted firmly against the mold so that the annular groove is coaxial with the tire and positioned so as to place the final sidewall strip the desired distance from the rim on which the tire is mounted. The mold is then heated sufficiently to cause the sidewall strip to vulcanize to the side of the tire. The final product is a sidewall strip on the tire which has a rectangular shaped cross section. Because of the rectangular shaped cross section the sidewall strip catches on foreign objects and has a tendency to tear loose at the edges. Also, upon a close scrutiny the sidewall strip does not give the desired appearance of being an original part of the tire.

In the present invention a strip of uncured rubber or other elastomer is utilized which has a width approximately one-half that of the desired final sidewall strip. The strip of elastomer is placed in a mold or matrix having an annular groove therein which has an arcuate cross section. The portion of a tire on which it is desired to provide a sidewall strip is buffed to produce a rough surface to which the sidewall strip will adhere. The tire is then clamped against the matrix so that they are coaxial and the groove in the matrix is positioned over the portion of the tire on which the sidewall strip is to be provided. Air is then introduced into the tire so that the sides of the groove in the matrix are firmly positioned against the side of the tire with no openings therebetween. The matrix is then heated by means of an electric heating element, steam, or some other method to the point at which the elastomer flows to fill the groove in the matrix. The heating of the rubber vulcanizes or cures the rubber and causes it to adhere to the previously roughened side of the tire. The final product is a sidewall strip of the desired width having feathered edges. Because the edges are feathered they appear to blend into the tire and are not easily caught by foreign objects and loosened. Also, because of the feathered edges the sidewall strip appears to be an original portion of the tire rather than an added portion.

An object of the present invention is to provide improved methods and apparatus for producing sidewall strips on rubber tires.

A further object of the present invention is to provide improved methods and apparatus for producing sidewall strips having feathered edges which will not be loosened by foreign objects and which appear to be an original portion of the tire.

These and other objects of the present invention will become apparent upon consideration of the following specification, claims and drawings, of which:

FIGURE 1 is a view in side elevation of the present invention having a tire mounted thereon;

FIGURE 2 is an enlarged view in top plan of FIGURE 1 with portions thereof broken away;

FIGURE 3 is an enlarged view in top plan of FIGURE 1 with the tire and clamping plate therefor removed and having portions thereof broken away and shown in section;

FIGURE 4 is a fragmentary view in side elevation of a tire showing a portion thereof in a buffed condition;

FIGURE 5 is an enlarged view in axial section as seen from the line 5—5 of FIGURE 1, on an enlarged scale;

FIGURE 6 is a greatly enlarged detailed view in section as seen from line 6—6 of FIGURE 2 showing of elastomer prior to molding; and FIGURE 7 is a greatly enlarged detailed view in section as seen from the line 6—6 of FIGURE 2 showing a strip of elastomer after it has been molded into a sidewall strip.

In the various views similar parts have the same number for ease in identifying the parts in all of the views. In FIGURE 1 a base 10 is utilized to maintain the present apparatus in a convenient position. Fixedly attached to the base 10 is a shaft 11 which has disc-shaped horizontal platform 12 fixedly mounted at the top thereof. A bolt 13 threaded at either end is firmly screwed into a threaded, axial aperture in the top end of shaft 11 and may in fact be an integral part thereof. A ring-shaped member 15, comprised of some heat conducting material and having a radius approximately equal to the radius of platform 12, is placed on the upper side of the platform 12. Member 15 is coaxial with platform 12 and has feet 17 in abutting relationship therewith. Insulating material 18 is placed between member 15 and platform 12, intermediate feet 17 around the protruding portions of a heating element 20. The member 15 is firmly affixed to platform 12 by some means such as bolts 19.

Heating element 20, which may be an electrical unit or some similar device is imbedded in the member 15. Heating element 20 has an annular form and in the present embodiment lies near the outer periphery of the member 15 and is concentric therewith. As can be seen in FIGURES 3 and 5 the two ends of the heating element 20 extend inwardly from the member 15 and are electrically attached to a combination thermostat and manual switch unit 21. The thermostat and switch unit 21 has an electrical cord 22 attached thereto for applying the proper electrical energization to the heating element 20. It should be understood that an electrical heating element 20 is shown in the present embodiment for simplification and that many other methods, such as a steam line in place of the heating element, might be utilized by those skilled in the art.

A ring-shaped matrix or mold 25 which is comprised of some heat conducting material and in general has a radius approximately equal to the radius of the ring-shaped member 15 is placed in an abutting relationship with the upper surface of the ring-shaped member 15. In the present embodiment the matrix 25 has three ears 26, which are an integral portion thereof, extending inwardly from the inner surface of the matrix 25 and which when firmly affixed to the ring-shaped member 15 by some means such as bolts 27 serve to hold the matrix 25 firmly in place and in contact with the member 15. The upper surface of the matrix 25 is sloping slightly from the horizontal in an outward direction from the center of the matrix 25 so that it approximately matches the adjacent sidewall surface of the tire 30 where it is desired to affix the sidewall strip.

The tire 30 which is mounted on a rim or wheel 31 is placed over the bolt 13 and is centered thereon by means of a truncated cone-shaped member 32 which has a centrally located hole therein and fits snugly over bolt 13. The wheel 31 and tire 30 are then held in place by means of a large washer 33 and a nut 34 having a pair of handles 35 attached thereto. When the wheel 31 is placed over the truncated cone 32 the tire 30 is coaxial with the matrix 25 and contacts the matrix 25 along the side of the tire 30 on which it is desired to place a sidewall strip.

A cross section of the matrix 25 can be seen more clearly in the FIGURES 6 and 7. From these figures it can be seen that the upper surface of the matrix 25 has a concave groove therein with an arcuate cross section. This groove in the upper surface of the matrix 25 is designated by numeral 40 in the figures. The groove 40 is canted from the horizontal in an outward direction from the center or axis of the device so that the tire 30 when placed in position, as shown in the various figures, forms a plane surface across the opening of the groove 40. The groove 40 has a width equal to the desired width of the final sidewall strip.

To utilize the described apparatus in providing a sidewall strip on a rubber tire one possible method includes at least the following procedure. Buff the side of the tire along which it is desired to provide a sidewall strip. As shown in FIGURE 4 buffing the side of the tire provides a surface portion 45 which has many minute particles of rubber protruding therefrom to which the sidewall strip material may adhere. Thus, a solid bond between the sidewall strip and the side of the tire is produced. The apparatus should be heated to the operating temperature by energizing the heating element 20 for a sufficient length of time, approximately 15 to 20 minutes, prior to using the apparatus. A strip of elastomer 50 is then laid in the groove 40 and cut so that it is approximately the same length as the groove 40. The strip of elastomer may be any of the well-known elastomers used in the tire industry, such as rubber, and should be in the uncured state. The strip of elastomer 50 is laid in the groove 40 along the upper or inner edge of the groove and in FIGURE 6 it is illustrated in cross section before the tire is placed in position by the dotted line 51. Once the strip of elastomer 50 is in position the wheel 31 having tire 30 thereon is placed over the truncated cone 32. The washer 33 is placed over bolt 13 and the nut 34 is then threaded onto the bolt 13 and tightened down by means of handles 35. The elastomer strip 50 is deformed by the tire 30 into the tear-drop shape shown in FIGURE 6. Air is then introduced into the tire to insure a snug fit between the side of the tire and the sides of the groove 40. To introduce air into the tire 30 the valve stem 36 of the wheel 31 is connected to an air duct 37 of the present apparatus.

It should be noted that the orginal width of the elastomer strip 50, as illustrated by the dotted line 51, is approximately one-half of the desired width of the final sidewall strip, which is also the width of the groove 40. As the pressure in the tire 30 increases the shape of the elastomer strip 50 is slowly deformed into the shape shown in FIGURE 7. It has been found that a pressure of 50 to 60 pounds in the tire provides a satisfactory seal between the groove 40 and the tire 30 but this pressure is not critical and different pressures may be utilized with good results.

The thermostat 21 is set to energize the heating element 20 so that the matrix 25 remains hot enough to cause the elastomer 50 to flow. Once the elastomer 50 is in a semi-liquid or plastic state and the tire 30 is filled with air the tire 30 forces the elastomer to fill the entire groove 40 of the matrix 25. Any excess elastomer as well as the air trapped in the groove 40 is forced out of a plurality of vents 41 in the matrix 25. This eliminates air pockets and excess elastomers to provide a smooth surface and a smooth feathered edge. The vents 41 are illustrated as a plurality of small holes in the matrix but it should be understood that the device could also be vented by simply grinding or cutting radial grooves in the matrix. The relationship of the tire 30 and the elastomer 50 after the elastomer has been heated to a point at which it flows and the tire 30 has been filled with air, can be seen more clearly in FIGURE 7. In FIGURE 6 it can be seen that the heated elastomer 50 before filling the tire 30 with air causes a slight bulge in the tire 30 while in FIGURE 7 it can be seen that the tire has assumed a flat position with respect to the elastomer 50 and the matrix 25.

Once the elastomer 50 has been heated for a sufficient period of time to allow it to cure the wheel 31 is removed from the apparatus. Because of the buffed portion 45 on the tire 30 the elastomer 50 bonds firmly to the side of the tire 30. Also, because the groove 40 has an arcuate cross section the elastomer 50 will produce a sidewall strip with feathered or tapered edges as can be seen in FIGURE 7. The feather edges of the sidewall strip give it the desirable appearance of being an original part of the tire 30. Also, because the edges of the sidewall strip are feathered rather than having a rectangular cross section they are not easily caught by foreign objects and torn loose from the tire 30.

In addition to the many advantages already mentioned the present invention reduces the amount of elastomer utilized in a sidewall strip by one-half that required in the prior art devices. Also, the time required to apply the sidewall strip 50 to the side of the tire 30 is reduced by approximately one-half that required in prior art devices since the heating time is reduced because only one-half the quantity of elastomer is utilized. Thus, besides increasing the appearance and the life of the sidewall strip the present invention decreases the cost of application by decreasing the amount of elastomer required and the time required for application.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A method of providing a sidewall strip on a rubber tire comprising the steps of:

(a) buffing the portion of said tire to which the sidewall strip is to be applied;

(b) placing a strip of elastomer having a width smaller than the desired final radial width of the sidewall strip in a matrix having an annular groove therein with a cross section which forms a substantially continuous arc between the outermost edge thereof heated to the flowing point of said elastomer;

(c) abutting said buffed portion of said tire against said matrix in a coaxial relationship under pressure; and (d) heating said matrix until said strip of elastomer flows in said matrix to provide a sidewall strip having feathered edges and the desired width firmly bonded to the buffed portion of said tire.

2. A method of providing a sidewall strip on a rubber tire as set forth in claim 1 having in addition the step of providing vents in the matrix to allow venting of air from said matrix during the heating step.

References Cited

UNITED STATES PATENTS

| | | | |
|---|---|---|---|
| 2,802,512 | 8/1957 | Rouse | 156—394 X |
| 2,868,270 | 1/1959 | Brown | 156—394 |
| 3,113,902 | 12/1963 | Dismuke | 156—116 X |
| 3,164,192 | 1/1965 | Kasio et al. | 156—116 X |
| 3,232,816 | 2/1966 | Fields | 156—394 |

EARL M. BERGERT, *Primary Examiner.*

C. B. COSBY, *Assistant Examiner.*